United States Patent [19]
Plasser et al.

[11] 3,792,533
[45] Feb. 19, 1974

[54] APPARATUS FOR MEASURING AND RECORDING A DISTANCE TRAVELLED BY A VEHICLE

[76] Inventors: Franz Plasser; Josef Theurer, both of Johannesgasse 3, Vienna, Austria

[22] Filed: Sept. 28, 1972

[21] Appl. No.: 292,879

[30] Foreign Application Priority Data
Oct. 4, 1971   Austria.................................... 8528

[52] U.S. Cl................. 33/144, 33/141 R, 33/141.5, 235/92 DN, 235/95 R, 324/171
[51] Int. Cl....... G01b 3/12, G01b 7/04, G01c 22/02
[58] Field of Search ...........33/141 R, 141 B, 141 E, 33/141.5, 142, 144, 146, 125 M; 235/95 R, 92 DN; 73/146; 324/171

[56] References Cited
UNITED STATES PATENTS

| | | | |
|---|---|---|---|
| 3,268,727 | 8/1966 | Shepard | 246/122 R |
| 3,364,579 | 1/1968 | Fisher | 73/146 |
| 3,441,943 | 4/1969 | McCue et al. | 324/171 |

*Primary Examiner*—Louis R. Prince
*Assistant Examiner*—Steven L. Stephan
*Attorney, Agent, or Firm*—Kurt Kelman

[57] ABSTRACT

An apparatus for measuring and recording a distance traveled by a track survey car comprises a rotary odometer, a moving recording band, and a drive for moving the band and/or a device for applying marks to the band which indicate the traveled distance. A pulse generator is mechanically connected with the odometer and sends a set number of pulses per rotation of the odometer to one input of a digital-analog converter. A pulse transmitter at a fixed distance from the odometer axle and above the rolling surface thereof is connected to the other converter input. A comparator is connected to the converter output and is adjustable to a signal value corresponding to a predetermined distance traveled by the vehicle. The output of the comparator is connected to the drive or to the marking device.

11 Claims, 4 Drawing Figures

PATENTED FEB 19 1974　　3,792,533
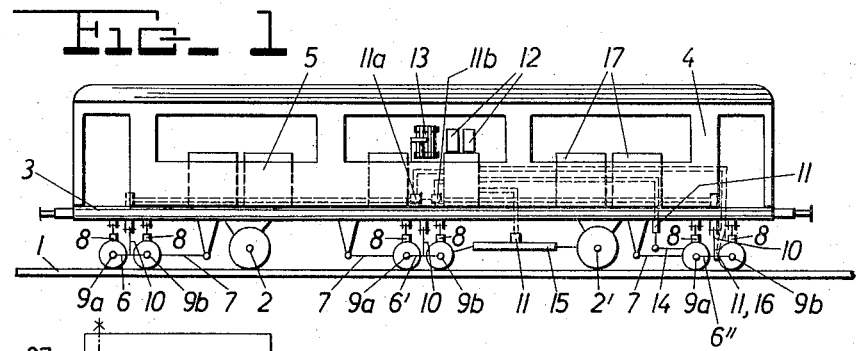
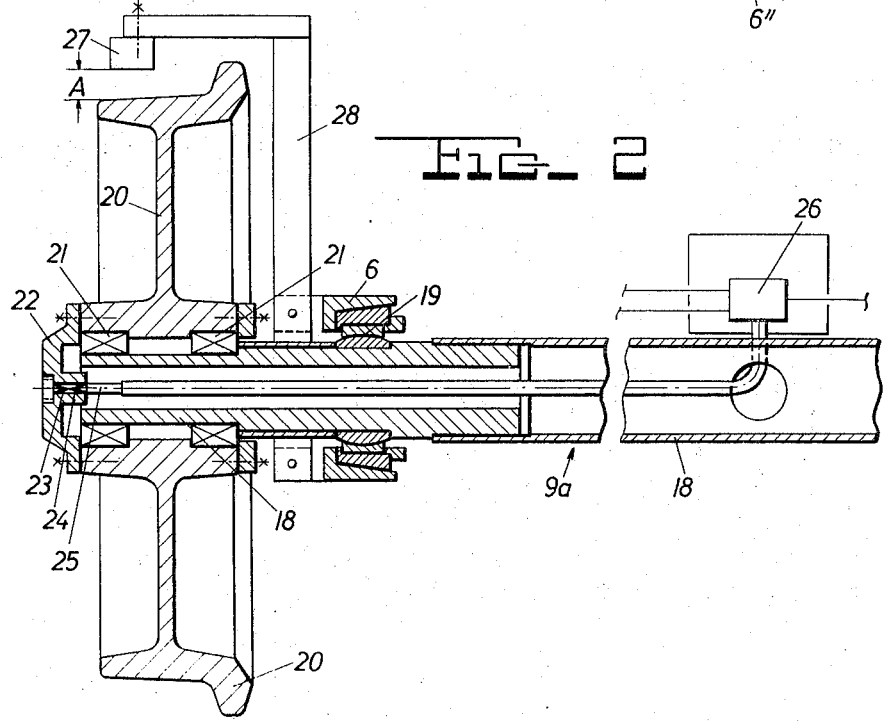
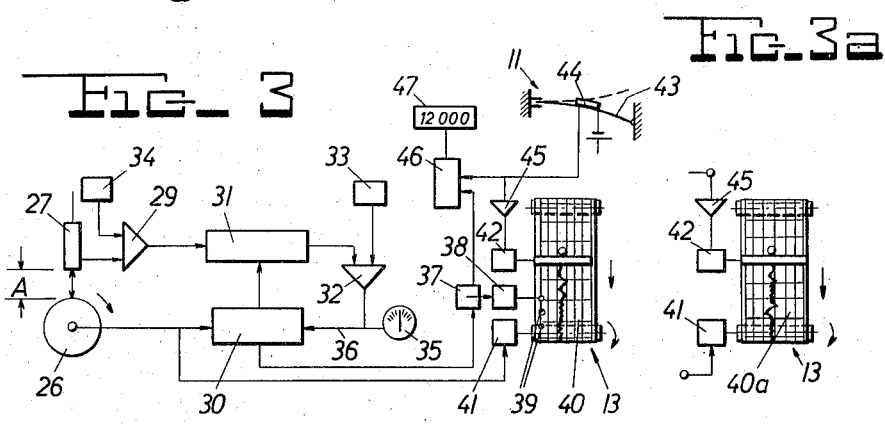

APPARATUS FOR MEASURING AND RECORDING A DISTANCE TRAVELLED BY A VEHICLE

The present invention relates to improvements in an apparatus for measuring and recording a distance traveled by a vehicle, such as a track survey car advancing along a track, wherein a rotary odometer associated with the vehicle for travel therewith is connected with a drive for moving a record sheet continuously recording measured track survey values or to a device for applying marks to the record sheet which indicate the traveled distance.

In known apparatus of this type, the rotary odometer is coupled directly with the drive for the moving record sheet. In this manner, the band of the recording instrument is driven proportionally to the traveled distance.

Rotary odometers become worn, due to their frictional rolling contact with the track rail or other surface on which the vehicle travels, so that they slowly but steadily increase the number of rotations per mile. To undo resultant errors in recording, correction gearing has been mounted between the odometer and the record sheet drive. These are usually steplessly adjustable gears which must be manually adjusted according to the state of wear of the odometer wheel. This involves continously controlling the diameter of the odometer wheel, which is very time-consuming. Furthermore, this control and the manual adjustments made the complete elimination of errors impossible.

It is the primary object of this invention to provide an apparatus of the indicated type wherein the above source of error is automatically eliminated in the recorder drive and the traveled distance, as determined by the odometer, is continuously accurately recorded.

This object is accomplished by the invention with an electrical control circuit comprising a pulse generator mechanically connected with the rotary odometer and arranged to emit a set number of pulses per rotation of the odometer. One of the two inputs of a digital-analog converter receives the pulses emitted by the generator and an inductive pulse transmitter arranged at a fixed distance from the odometer axle and spaced from the rolling surface thereof is connected to the other input of the converter. A comparator is connected to the output of the converter. The comparator is adjustable to a signal value corresponding to a predetermined distance traveled by the vehicle, and the comparator has an output connected to a means associated with the movable record sheet for establishing lengths of the record sheet in the direction of the movement thereof which are proportional to corresponding distances traveled by the vehicle. This means maybe a drive for moving the record sheet and/or a device for applying marks to the record sheet which indicate the traveled distance.

In this manner, the wear of the odometer wheel is compensated fully electronically and automatically without any possibilities of errors arising, as has been the case with the conventional manual adjustments.

According to a preferred feature, an automatically adjustable pulse counter is connected between the pulse generator and the converter, the one converter input receiving the emitted pulses through the counter, and the comparator output being connected to the counter. In this manner, an automatic correction of the pulses may be effectuated in the pulse counter in response to the output signals coming from the comparator. For instance, the beginning of the pulse emission may be changed according to the required correction values.

In accordance with another feature of the present invention, an amplifier having an amplification factor $\pi$ is connected between the pulse transmitter and the other converter input. This produces a direct correlation between the voltage signals emitted by the inductive pulse transmitter and the circumference of the odometer wheel, which changes due to wear. It will be useful to adjust the amplifier through a second input in response to the output signals of the comparator.

The automatic distance measurements of this invention are particularly useful in combination with a general system for evaluating track conditions. For this purpose, the vehicle may carry at least one instrument for indicating a track condition and for emitting a signal corresponding to the indicated condition, and constituting a track survey value, a signal transmitter receiving this signal, and means for evaluating the signal connected to the signal transmitter. The evaluating means is connected to the record sheet drive or marking device.

The above and other objects, advantages and features of the invention will become more apparent from the following detailed description of certain now preferred embodiments thereof, taken in conjection with the accompanying drawing wherein FIG. 1 is a side view of a track survey car incorporating a plurality of instruments for indicating parameters corresponding to given track conditions and given track survey values;

FIG. 2 is a cross section of a rotary odometer useful in the apparatus of this invention;

FIG. 3 is a circuit diagram illustrating the structure and functioning of the apparatus according to one embodiment thereof; and FIG. 3a is a modification of the circuitry of FIG. 3.

Referring now to the drawing, wherein like reference numerals designate like parts operating in a like manner in all figures, FIG. 1 shows a track survey car having a chassis 3 and a body 4. The chassis is mounted on undercarriages 2, 2' whose wheels run on track rails 1, 1 so that the track survey car is mounted for mobility in the direction of track elongation, thus constituting a vehicle traveling distances which are to be measured and recorded. In the illustrated embodiment, the car is self-propelled, a drive motor 5 being connected to the drive axle of undercarriage 2 for moving the car along the track. Measuring bogies 6, 6' and 6'' are mounted on the chassis, the measuring bogie 6' being arranged intermediate and substantially centrally between the undercarriages 2, 2' while measuring bogies 6, 6'' are arranged in the respective end regions of the car adjacent the undercarriages.

Each measuring bogie comprises two lateral rail position measuring axles 9a, 9b and is mounted on the chassis by means of pivotal rods 7 one of whose ends is pivoted to the underside of the chassis. Obliquely outwardly directed hydraulic motors 8 connect respective axles of each measuring bogie to the chassis so that each bogie may be lifted off the track rails when not in use. Due to the outward bias, the hydraulic motors simultaneously serve to press the flanged wheels of the measuring axles against a respective rail.

The ordinates, i.e. the lateral alignment of the track rails, are measured by all three measuring bogies, the relative movement of the axles 9a and 9b transversely to the chassis 3 being transmitted by pivotal arm 10 to a measuring instrument which transmits a corresponding measuring signal to a transmitter 11a, 11b (for the left and right rail, respectively) whose output signals are emitted to an indicating instrument 12 and/or a recording instrument 13. The illustrated track survey car also carries additional track survey instruments 14, 15 and 16 for determining other track parameters all of which are electrically connected to transmitter 11 for producing signals at the instrument 12 and/or 13 which thus indicate and/or record the track conditions. Computers 17 are mounted on the car to be programmed with the signals for producing desired track renewal parameters.

Track survey cars of this general type have been disclosed in some prior patent applications by the present inventors and the invention is not concerned therewith, except as combined with the apparatus hereinbelow described in detail by way of illustration.

In a track survey of the above-described type, the record sheet of the recording instument 13 must be driven in direct proportion to the distance traveled by the car so that the measured track parameters, or survey values, such as ordinates, grades, track gages, etc., appear on the moving record band at the exact point of the track where they have been measured to give a correct picture of the surveyed track.

FIGS. 2, 3 and 3a illustrate apparatus which fully automatically and dependably controls the operation of recording instrument 13 on which a stylo continuously records the measured track survey values.

As shown in FIG. 2, one of the measuring axles 9a is a tubular axle 18 pivotally journaled in a ball-and-socket joint 19 in measuring bogie 6. A flanged wheel 20 of the bogie is rotatably mounted on the free end of axle 18 by means of ball bearings 21, this wheel serving as a rotary odometer whose thread or rolling surface is in continuous rolling contact with a track rail 1. The hub of rotary odometer 20 carries a hub cap 22 which has an inwardly projecting bearing with a central bore receiving an end portion 24 of polygonal cross section of flexible axle 25. This flexible axle is thus connected with the odometer wheel for rotation therewith and extends through the axial bore of axle 18, being connected to pulse generator or encoder 26 which emits a set number of pulses per rotation of the wheel 20. The number of pulses corresponds to the diameter of the odometer wheel and thus to the distance traveled by the car.

Since the odometer wheel is subject to wear, i.e. its diameter decreases gradually, the number of impulses emitted for a given distance traveled would correspondingly be gradually increased so that the track record on recorder 13 would be distorted. This is avoided by mounting an inductive pulse transmitter 27 at a fixed distance from the odometer axle above the rolling surface thereof. For this purpose, a bracket 28 is affixed to bogie 6 to carry transmitter 27 at fixed distance A from the rolling surface of wheel 20. This inductive pulse transmitter emits voltage signals corresponding to the distance A, these signals being directly proportional to the circumference of the wheel at all times and thus useful to correct the distance scale on recorder 13.

As will be seen from FIG. 3, the signals emitted by inductive transmitter 27, which may be adjusted, for instance, to a value of 1 mV per millimeter distance from the rolling surface of the odometer wheel, are transmitted to one input of amplifier 29 which amplifies the output signals or pulses of transmitter 27 by a given value, for instance $\pi$. The resultant output signal corresponds to the circumference of wheel 20 at all times.

The pulse generator 26, which is mechanically connected with the rotary odometer, emits $n$ number of pulses each corresponding to an $n$th part of the odometer circumference. The pulses are counted by automatically adjustable counter 30 which receives the pulses from the generator 26 so that the traveled distance is measured with an accuracy of $\pi d/n$. As has been mentioned, the diameter $d$ of the odometer wheel, and thus the circumference thereof, may change so that the traveled distance per rotation changes. To compensate for such a change, the output of the counter 30 is connected to one of the inputs of digital-analog converter 31, i.e. the pulses from generator 26 are received by this converter input. This converter produces an analogous stepped output signal, the height of the signal steps being a function of the output signal fed into the other converter input from amplifier 29, i.e. from the inductive pulse transmitter 27. The output of converter 31 is connected to one input of comparator 32, the other input of the comparator being set to a level or signal value corresponding to the number of steps (pulses) for a predetermined distance traveled by the car.

This level or signal value is adjusted by means of an adjustment element 33 at the other comparator input and is reached after a set number of pulses. When the number of pulses increases, the amplitude of the steps must be correspondingly increased to reach the set level at a smaller number of impulses corresponding to the predetermined distance traveled. This may be done by a further adjustment element at the second input of amplifier 29 in response to the output signals of the comparator.

An indicating instrument 35 is shown to be connected to comparator 32 to indicate visibly the difference between the set signal value and the actual analogous output signal of digital-analog converter 31.

To enable the distance scale on the recording band 13 to be corrected automatically, the output of comparator 32 is connected to the automatically adjustable pulse counter 30 by return line 36 so that, for instance, the start of transmission of the pulses from counter 30 to recorder 13 may be set according to the correction signal determined by the output signal of comparator 32. The corrected output signal of counter 30 is transmitted either through a filter 37, which transmits, for instance, only every 100th pulse, to a device 38 which applies distance marks 39 to the calibrated paper band 40 of recording instrument 13, as shown in the embodiment of FIG. 3, or directly to the stepping motor 41 which drives the paper band 40a of the recorder, as shown in FIG. 3a. In either case, lengths are established on the record sheet in the direction of movement thereof which are directly proportional to corresponding distances traveled by the car along the track.

In the embodiment of FIG. 3, the stepping motor 41 for driving the record band receives the pulses from pulse generator 26 directly or, if desired, through a pulse counter (not shown) similar to counter 30. In this case, the paper band is driven without taking into account the wear of odometer wheel 20 but the distance marks 39, indicating, for example, every 100 or 1,000 meters, are applied to the band correctly, thus giving an accurate reading. In the modification of FIG. 3a, on the other hand, the paper band 40a has the distance marks printed thereon and the drive is corrected through the apparatus of the invention.

The drawing also shows the stylo mechanism 42 which inscribes a curve on the moving record band which reflects the measured track condition parameters. As schematically illustrated in FIG. 3, the track parameters may be received from a track sensor (not shown) which deforms a flexible rod 43 in response to a sensed track condition, such as a lateral or vertical track misalignment, a strain gage 44 being bonded to the flexible rod to produce a corresponding measuring signal reflecting the measured track condition. This signal is amplified at amplifier 45 and the amplified signal is transmitted to the stylo mechanism to operate the same.

In the illustrated embodiment, a computer 46 also receives the measured signals from transmitter 11 consituted by strain gage 44 to evaluate the same and to give a read-out of the track condition at 47.

We claim:

1. An apparatus for measuring and recording a distance traveled by a track survey car advancing along a track, comprising
   1. a rotary odometer associated with the car for travel therewith, the odometer having a rolling surface and an axle about which it is mounted to rotate,
      a. rotation of the odometer measuring traveled distances,
   2. a recording instrument with a movable record sheet whereon track survey values may be continuously recorded as the sheet is moved,
   3. an electrical control circuit including
      a. a pulse generator mechanically connected with the rotary odometer and arranged to emit a set number of pulses per rotation of the odometer,
      b. a digital-analog converter having two inputs and an output, one of the converter inputs receiving the pulses emitted by the generator,
      c. sensing-transmitter means arranged at a fixed distance from the odometer axle and spaced from the rolling surface of the odometer, the sensing transmitter means being operative to sense the diameter of the rolling surface and being connected to the other converter input, and
      d. a comparator connected to the output of the converter, the comparator providing an output corresponding to a predetermined distance traveled by the car, and
   4. means associated with the movable record sheet and responsive to the output of the comparator for establishing lengths of the record sheet in the direction of the movement thereof which are proportional to corresponding distances traveled by the car along the track.

2. The apparatus of claim 1, wherein the means associated with the movable record sheet includes a drive for moving the record sheet.

3. The apparatus of claim 1, wherein the means associated with the movable record sheet includes a device for applying marks to the record sheet which indicates the traveled distance.

4. The apparatus of claim 1, further comprising an automatically adjustable pulse counter connected between the pulse generator and the converter, the one converter input receiving the emitted pulses through the counter, and the comparator output being connected to the counter.

5. The apparatus of claim 1, further comprising an amplifier having an amplification factor $\pi$ connected between the sensing-transmitter means and the other input of the converter.

6. The apparatus of claim 5, wherein the amplifier has two inputs, one of the inputs being connected to the sensing-transmitter means, and the amplifier being adjustable through the other input thereof in response to the output signals of the comparator.

7. The apparatus of claim 1, wherein the means associated with the movable record sheet includes a stepping motor for moving the record sheet, the stepping motor being connected to the pulse generator, and a device for applying marks to the record sheet which indicate the traveled distance, the said device being connected to the output of the comparator.

8. The apparatus of claim 7, further comprising an automatically adjustable pulse counter connected between the pulse generator and the converter, the one converter input receiving the emitted pulses through the counter, the comparator output being connected to the counter, and the counter being connected to said device, a filter being connected between the counter and the device.

9. The apparatus of claim 1, wherein the means associated with the movable record sheet includes a stepping motor for moving the record sheet, the stepping motor being connected to the output of the comparator.

10. The apparatus of claim 1, further comprising a flexible axle connecting the pulse generator to the odometer.

11. The apparatus of claim 1, further comprising at least one instrument for indicating a track condition and for emitting a signal constituting a track survey value, a signal transmitter receiving said signal, means for evaluating the signal and connected to the transmitter, and the evaluating means being connected to the means associated with the movable record sheet.

* * * * *